United States Patent
El-Keyi et al.

(10) Patent No.: US 11,546,041 B2
(45) Date of Patent: Jan. 3, 2023

(54) METHOD AND APPARATUS FOR BEAMSPACE PROCESSING BASED ON MULTIPLE BEAMSPACE BASES

(71) Applicant: Telefonaktiebolaget LM Ericsson (publ), Stockholm (SE)

(72) Inventors: Amr El-Keyi, Kanata (CA); Chandra Bontu, Nepean (CA); Jagadish Ghimire, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/427,598

(22) PCT Filed: Feb. 8, 2019

(86) PCT No.: PCT/IB2019/051046
§ 371 (c)(1),
(2) Date: Jul. 30, 2021

(87) PCT Pub. No.: WO2020/161526
PCT Pub. Date: Aug. 13, 2020

(65) Prior Publication Data
US 2022/0123816 A1    Apr. 21, 2022

(51) Int. Cl.
*H04B 7/06* (2006.01)
(52) U.S. Cl.
CPC ................. *H04B 7/0695* (2013.01)
(58) Field of Classification Search
CPC .................................................. H04B 7/0695
See application file for complete search history.

(56) References Cited

U.S. PATENT DOCUMENTS 6,598,014 B1 * 7/2003 Rabideau .................. G01S 7/36
702/194
10,541,739 B1 * 1/2020 Nammi ................ H04B 7/0857
(Continued)

OTHER PUBLICATIONS

International Search Report and Written Opinion for Application No. PCT/IB2019/051046, dated Oct. 2, 2019, 11 pages.
(Continued)

*Primary Examiner* — Kenneth T Lam
(74) *Attorney, Agent, or Firm* — Nicholson De Vos Webster & Elliott LLP

(57) ABSTRACT

A method and apparatus for beamspace processing in a radio access node are proposed. A channel estimate, which characterizes a radio channel between the antenna elements of an antenna array and a user equipment for a given time and a given frequency, is transformed using multiple distinct sets of spatial orthonormal basis functions to obtain transformed channel estimates. Each one of the distinct sets of spatial orthonormal basis functions defines a respective one of beamspace transformations. Based on measures of quality of beamspace transformation, a set of spatial orthonormal basis functions is selected from the sets of the spatial orthonormal basis functions to satisfy a beamspace reduction criteria for the radio channel. Data streams are encoded, based on a selected transformed channel estimate, into encoded data streams. The encoded data streams are then transmitted through the antenna elements of the antenna array.

17 Claims, 7 Drawing Sheets

(56) References Cited

U.S. PATENT DOCUMENTS

| | | | | |
|---|---|---|---|---|
| 2007/0243827 | A1* | 10/2007 | Sayeed | H04W 28/06 |
| | | | | 455/67.11 |
| 2016/0248484 | A1* | 8/2016 | Sayeed | H04B 7/0695 |
| 2016/0352012 | A1* | 12/2016 | Foo | H04L 25/03343 |
| 2017/0019157 | A1* | 1/2017 | Mo | H04B 7/0456 |
| 2018/0337725 | A1* | 11/2018 | Stephenne | H04B 7/2603 |
| 2021/0021446 | A1* | 1/2021 | Shikida | H04B 7/0617 |
| 2021/0344393 | A1* | 11/2021 | Dai | H04B 7/088 |

OTHER PUBLICATIONS

Akbar Sayeed et al., "Beamspace MIMO for High-Dimensional Multiuser Communication at Millimeter-Wave Frequencies," Dec. 2013, 6 pages, 2013 IEEE Global Communications Conference.

Ericsson, "W1 design for implicit advanced CSI reporting," Aug. 22-26, 2016, 6 pages, 3GPP TSG-RAN WG1#86, R1-167645, Gothenburg, Sweden.

Written Opinion of the International Preliminary Examining Authority for Application No. PCT/IB2019/051046, dated Nov. 27, 2020, 6 pages.

International Preliminary Report on Patentability for Application No. PCT/IB2019/051046, dated Mar. 24, 2021, 19 pages.

Fredrik Rusek et al., "Scaling up MIMO: Opportunities and Challenges with Very Large Arrays," Jan. 16, 2012, 30 pages, arXiv:1201.3210v1 [cS.IT].

Akbar M. Sayeed, "Deconstructing Multiantenna Fading Channels," Oct. 2002, pp. 2563-2579, IEEE Transactions on Signal Processing, vol. 50, No. 10.

* cited by examiner

SELECT, BASED ON THE MEASURES OF QUALITY OF BEAMSPACE TRANSFORMATION, A SET OF SPATIAL ORTHONORMAL BASIS FUNCTIONS FROM AT LEAST ONE OF THE PLURALITY OF DISTINCT SETS OF THE SPATIAL ORTHONORMAL BASIS FUNCTIONS TO SATISFY A BEAMSPACE REDUCTION CRITERIA FOR THE RADIO CHANNEL
206

SELECT FOR EACH ONE OF THE PLURALITY OF BEAMSPACES A RESPECTIVE SUBSET OF BEAMS FROM THE RESPECTIVE SET OF BEAMS TO BE ACTIVATED BASED ON THE BEAMSPACE REDUCTION CRITERIA
302

DETERMINE, BASED ON THE SUBSETS OF BEAMS TO BE ACTIVATED FOR THE BEAMSPACES, THE BEAMSPACE THAT YIELDS A RESPECTIVE SUBSET OF BEAMS TO BE ACTIVATED THAT HAS A NUMBER OF BEAMS THAT IS SMALLER THAN A NUMBER OF BEAMS OF OTHER ONES OF THE RESPECTIVE SUBSETS OF BEAMS
304

RESPONSIVE TO DETERMINING THAT THERE ARE AT LEAST TWO BEAMSPACES THAT HAVE A SAME NUMBER OF BEAMS THAT IS SMALLER THAN A NUMBER OF BEAMS OF OTHER ONES OF THE RESPECTIVE SUBSETS OF BEAMS, DETERMINE THE BEAMSPACE FROM THE AT LEAST TWO BEAMSPACES THAT HAS A GREATER CUMULATIVE MEASURE OF POWER FOR THE RESPECTIVE SUBSET OF BEAMS TO BE ACTIVATED THAN THE CUMULATIVE MEASURE OF POWER FOR THE RESPECTIVE SUBSET OF BEAMS OF THE OTHER ONES OF THE AT LEAST TWO BEAMSPACES
306

Fig. 3

SELECT FOR EACH ONE OF THE BEAMSPACES A RESPECTIVE SUBSET OF BEAMS FROM THE RESPECTIVE SET OF BEAMS TO BE ACTIVATED BASED ON THE POWER OPTIMIZATION CRITERIA
302

SELECTING, BASED ON A MEASURE OF POWER PER BEAM FOR EACH ONE OF THE BEAMSPACES, THE RESPECTIVE SUBSET OF BEAMS THAT YIELDS A MAXIMUM MEASURE OF POWER OF THE TRANSFORMED CHANNEL ESTIMATE IN THE BEAMSPACE AT A GIVEN TIME, WHERE THE NUMBER OF BEAMS IN THE RESPECTIVE SUBSET IS A PREDETERMINED NUMBER OF BEAMS
402

SELECT, BASED ON A MEASURE OF POWER PER BEAM FOR EACH ONE OF THE BEAMSPACES, THE RESPECTIVE SUBSET OF BEAMS THAT HAS A CUMULATIVE MEASURE OF POWER GREATER THAN A PREDETERMINED FRACTION OF A TOTAL MEASURE OF POWER OF ALL BEAMS OF THE TRANSFORMED CHANNEL ESTIMATE IN THE BEAMSPACE AT A GIVEN TIME
404

SELECT, BASED ON A MEASURE OF POWER PER BEAM FOR EACH ONE OF THE BEAMSPACES, THE RESPECTIVE SUBSET OF BEAMS WHERE EACH BEAM FROM THE SUBSET OF BEAMS HAS A RESPECTIVE MEASURE OF POWER GREATER THAN A PREDETERMINED THRESHOLD OF A TOTAL MEASURE OF POWER OF ALL BEAMS OF THE TRANSFORMED CHANNEL ESTIMATE IN THE BEAMSPACE AT A GIVEN TIME
406

Fig. 4

METHOD AND APPARATUS FOR BEAMSPACE PROCESSING BASED ON MULTIPLE BEAMSPACE BASES

CROSS-REFERENCE TO RELATED APPLICATIONS

This application is a National stage of International Application No. PCT/IB2019/051046, filed Feb. 8, 2019, which is hereby incorporated by reference.

TECHNICAL FIELD

Embodiments of the invention relate to the field of wireless communication; and more specifically, to the beamspace processing based on multiple beamspace bases.

BACKGROUND ART

Transmission points for wireless communication networks are increasingly being equipped with advanced antenna systems (AAS). These antenna systems increase the capacity and/or coverage of existing wireless systems by addition of an antenna array. This enables the simultaneous transmission of parallel data streams between a base station and a user, so called multiple-input-multiple-output (MIMO) transmission. In some cases, the main desired effect is rather to enhance coverage by exploiting the high beamforming gain of the new AAS systems.

Massive multiple-input multiple-output (MIMO) is a technology used in advanced antenna systems to improve data transmission capacity. Massive MIMO systems enable the transmission of multiple data streams, using the same time and frequency resource, where each data stream can be beamformed. A massive MIMO enabled base station can provide enhanced power efficiency via higher beamforming gain, enhanced spectral efficiency via higher spatial multiplexing gain, and reduced inter-cell interference through highly directional communication with narrow beams. However, massive MIMO technology significantly increases the complexity of wireless transceivers of a base station due to the high dimension of the spatial signal space. For example, in multiuser systems, complexity at the transmitter (e.g., base station) is also a concern since advanced encoding schemes must often be used to transmit information simultaneously to more than one user while maintaining a controlled level of inter-user interference.

A massive MIMO channel is the wireless communication channel coupling an antenna array of a massive MIMO system and a user equipment (UE). Propagation of the signal from the multiple elements of the antenna array to the antenna elements of the user equipment can be modeled based on a mathematical model represented with a massive MIMO channel matrix (H), which can be referred to herein as the channel matrix, the radio channel matrix, the wireless channel estimate matrix, or alternatively the channel matrix. Typically, a channel matrix is determined in the antenna space. Typically channel matrix is estimated at the base station from uplink transmissions received from the UE. The uplink transmissions may consist of a combination of known sequences from one or all of the transmit antennas and/or UE feedback about the channel information. Here the actual channel matrix and estimated channel matrix are interchangeably referred to as channel matrix.

A massive MIMO channel matrix is expected to have a low rank as communication occurs in a low-dimensional subspace of the high-dimensional spatial signal space. Beamspace transformation, where a set of orthogonal spatial functions or beams are used to approximate the eigenvectors of the massive MIMO channel covariance matrix, has been proposed to exploit the low rank of the signal subspace. As a result, a beamspace channel matrix results from the spatial transformation of a channel matrix. The transformation of the channel matrix into a beamspace channel matrix reduces the number of significant elements of channel vectors. Thus, a beamspace channel matrix includes a significantly lower number of non-zero channel vectors when compared with the number of non-zero channel vectors of the channel matrix expressed in antenna space. This lower number of significant elements of channel vectors enables to leverage the low rank of the beamspace channel matrix in subsequent signal processing operations and significantly reduces the complexity of these operations in the transmitter of the base station.

Several beamspace transformation approaches use a two-dimensional spatial discrete Fourier transform (2D-S-DFT) basis for transforming a channel matrix of a communication channel comprising uniformly-spaced two-dimensional (2D) polarized antenna arrays as a 2D-S-DFT basis matches the spatial signature of propagating plane waves. However, standard beamspace transformation approaches via S-DFT do not always provide sufficient dimension reduction. For example, in scenarios of multipath propagation, multiple propagation components will not be aligned with the beamspace basis used for the beamspace transformation contributing to multiple active beams for transmission of a signal. This problem is even more pronounced at low- and mid-bands where the spacing between elements of the antenna array can be larger than half the wavelength of the carrier signal.

SUMMARY

The proposed embodiments describe a method and system for efficient processing of radio channel estimates in beamspace. The embodiments propose the use of multiple beamspace transformations defined based on multiple sets of spatial orthonormal basis functions.

In one aspect a method for beamspace processing in a radio access node of a wireless communication network is presented. The radio access node is coupled with an antenna array including a plurality of antenna elements. The method includes transforming a channel estimate, which characterizes a radio channel between the antenna elements and a user equipment for a given time and a given frequency, using a plurality of distinct sets of spatial orthonormal basis functions to obtain a plurality of transformed channel estimates, wherein each one of the distinct sets of spatial orthonormal basis functions defines a respective one from a plurality of beamspaces; determining respective measures of quality of beamspace transformation for the plurality of transformed channel estimates; selecting, based on the measures of quality of beamspace transformation, a set of spatial orthonormal basis functions from at least one of the plurality of distinct sets of the spatial orthonormal basis functions to satisfy a beamspace reduction criteria for the radio channel. The method further includes encoding, based on a selected transformed channel estimate, one or more data streams into encoded data streams, wherein the selected transformed channel estimate is obtained by at least transforming the channel estimate based on the selected set of spatial orthonormal basis functions; and transmitting the encoded data streams through the antenna elements.

In one aspect, a radio access node for beamspace processing is presented. The radio access node comprising an antenna array including a plurality of antenna elements; one or more processors; and a computer readable storage medium storing a set of computer readable instructions that when executed by the one or more processors cause the radio access node to: transform a channel estimate, which characterizes a radio channel between the antenna elements and a user equipment for a given time and a given frequency, using a plurality of distinct sets of spatial orthonormal basis functions to obtain a plurality of transformed channel estimates, wherein each one of the distinct sets of spatial orthonormal basis functions defines a respective one from a plurality of beamspace transformations; determine respective measures of quality of beamspace transformation for the plurality of transformed channel estimates; select, based on the measures of quality of beamspace transformation, a set of spatial orthonormal basis functions from at least one of the plurality of distinct sets of the spatial orthonormal basis functions to satisfy a beamspace reduction criteria for the radio channel; encode, based on a selected transformed channel estimate, one or more data streams into encoded data streams, wherein the selected transformed channel estimate is obtained by at least transforming the channel estimate based on the selected set of spatial orthonormal basis functions; and transmit (210) the encoded data streams through the antenna elements.

BRIEF DESCRIPTION OF THE DRAWINGS

The invention may best be understood by referring to the following description and accompanying drawings that are used to illustrate embodiments of the invention. In the drawings:

FIG. 3 illustrates a flow diagram of exemplary operations that can be performed for selection of a beamspace from multiple beamspaces, in accordance with some embodiments.

FIG. 4 illustrates a flow diagram of exemplary operations that can be performed for selection for each beamspace of a subset of beams to be activated, in accordance with some embodiments.

DETAILED DESCRIPTION

Figure 1:
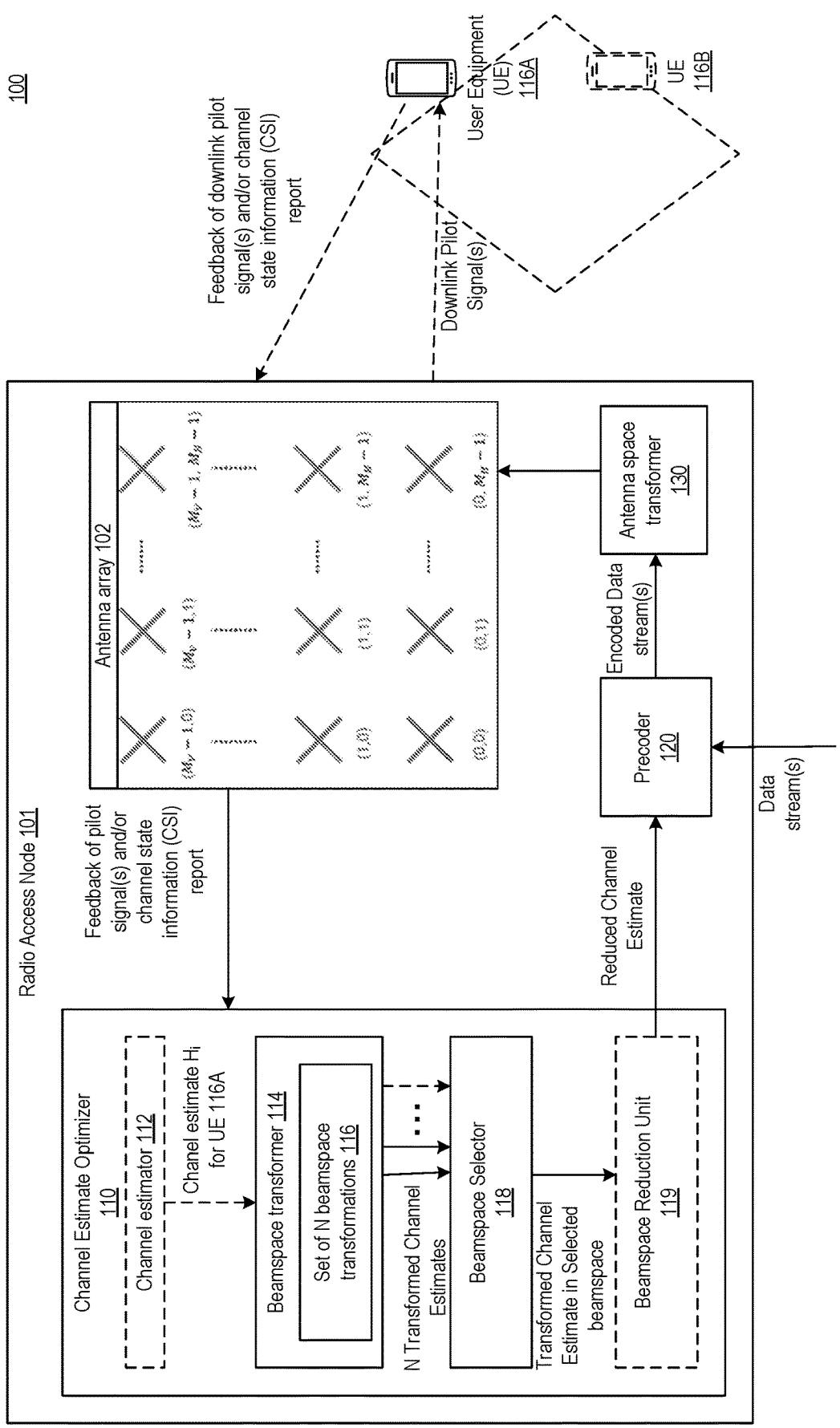
FIG. 1 illustrates a block diagram of exemplary system for beamspace processing based on multiple beamspace bases, in accordance with some embodiments.

The following description describes methods and apparatus for a method and system for efficient processing of radio channel estimates in beamspace. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

General Overview:

The proposed embodiments describe a method and system for efficient processing of radio channel estimates in beamspace. The embodiments of the present invention allow processing of channel estimates that increases the captured power in a beamspace-transformed channel estimate and/or increases its sparsity via beam reduction. The embodiments propose the use of multiple beamspace transformations defined based on distinct sets of spatial orthonormal basis functions. A single beamspace transformation (e.g., a set of spatial orthonormal basis functions) is then selected from the set of beamspace transformations based on one or more criteria that need to be satisfied by the channel estimate matrix when transformed. Several mechanisms are proposed for selecting the beamspace transformation from the set of beamspace transformations based on a measure of quality of the multiple beamspace transformations.

The mechanisms described herein present several advantages when compared with standard beamspace transformation techniques. The described mechanisms enable an increase of the power contained in the reduced channel estimates leading to a more accurate channel representation and improved performance of precoding operations performed in beamspace. Further, the mechanisms described herein increase the sparsity of the reduced channel estimate which significantly reduces the complexity of precoding calculation as well as the cost of transferring the weights computed during the precoding operation between different units of the radio access network device. In addition, the mechanisms reduce the noise that is added by the received signal as some weights are nullified through the beamspace reduction.

In one embodiment, a method and apparatus for beamspace processing in a radio access node of a wireless communication network are proposed. The radio access node is coupled with an antenna array including a plurality of antenna elements. In the disclosed embodiments, a channel estimate, which characterizes a radio channel between the antenna elements and a user equipment for a given time and a given frequency, is transformed using a multiple distinct sets of spatial orthonormal basis functions to obtain multiple transformed channel estimates. Each one of the distinct sets of spatial orthonormal basis functions defines a respective beamspace transformation from multiple beamspace transformations. Respective measures of quality of beamspace transformation are determined for the transformed channel estimates. Based on the measures of quality of beamspace transformation, a set of spatial orthonormal basis functions is selected from at least one of the plurality of distinct sets of the spatial orthonormal basis functions to satisfy a beamspace reduction criteria for the radio channel. Data streams are encoded, based on a selected transformed channel estimate, into encoded data streams, where the selected transformed channel estimate is obtained by at least transforming the channel estimate based on the selected set of spatial orthonormal basis functions. The encoded data streams are then transmitted through the antenna elements of the antenna array.

Exemplary System:

FIG. 1 illustrates a block diagram of a communication network 100, in accordance with some embodiments. The network 100 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 100 may be suitable for providing radio communications meeting one or more of the criteria established by the Next Generation Mobile Networks Alliance for the 5th generation of mobile telecommunications standards. In one embodiment, therefore, the communication network 100 may be a wireless cellular network.

The network 100 comprises a radio access node 101. In the illustrated embodiment, a single radio access node 101 is shown, but the skilled person will appreciate that any number of radio access nodes may be provided.

The radio access node 101 may be referred to as e.g. base station, NodeB, evolved NodeB (eNB, or eNodeB), gNodeB, base transceiver station, Access Point Base Station, base station router, Radio Base Stations (RBS), macro base stations, micro base station, pico base stations, femto base stations Home eNodeBs relays and/or repeater, beacon device or any other network node configured for communication with wireless devices over a wireless interface, depending e.g. on the radio access technology and terminology used.

The functions of the radio access node 101 may be distributed across one or more physical nodes. For example, each radio access node may be divided logically into more than one unit, comprising one or more of the following: a centralized unit (CU), a distributed unit (DU) and a radio unit (RU), remote radio head (RRH) or transmission point (TP).

The radio access node 101 may serve one or more cells of the network 100. Within each cell, wireless devices communicate with the respective radio access node to provide services to users of the devices as will be familiar to those skilled in the art. The radio access node 101 further communicates with a core network via a backhaul network (not illustrated), in order to co-ordinate and control the network 100 and provide access to other parts of the network 100 (e.g. devices in other cells, not illustrated).

In FIG. 1, two wireless devices 116a, 116b (collectively, 116) are shown in communication with radio access node 101. The wireless devices 116 may also be known as user equipments (UEs), mobile devices, mobile terminal devices, wireless terminal devices, etc. While several UEs 116 can be in communication with the base station and the following description can apply to any of the one several UEs, the embodiments will be described with reference to UE 116A with the interest of simplifying the following description and one of ordinary skill in the art would understand that the following mechanisms apply to multiple UEs.

Those skilled in the art will appreciate that wireless signals are transmitted between the radio access node 101 and the wireless devices 116 using the antenna array 102. The illustrated antenna array 102 includes a two-dimensional polarized array, where $M_V$ and $M_H$ respectively denote the number of rows and the number of columns of the 2-dimensional antenna array, and the total number of antenna elements is $2M_V M_H$. While the illustrated antenna array 102 is a two-dimensional polarized array, in other embodiments the antenna array can include single polarized antenna elements. While the mechanisms below will be described with reference to dual polarized antenna elements, one of ordinary skill in the art would understand that the same mechanism can be applicable to other types of antenna arrays (e.g., single polarized antenna arrays).

The radio access node 101 includes a channel estimate optimizer 110, a precoder 120, and an antenna space transformer 130. The channel estimate optimizer 110 is operative to determine an optimized channel estimate which is also referred to as a reduced channel estimate for the channel between the radio access node 101 and the UE 116A. The channel estimate optimizer 110 includes an optional channel estimator 112, a beamspace transformer 114, a beamspace selector 118, and a beamspace reduction unit 120.

The precoder 120 is operative to perform a precoding operation, based on the reduced channel estimate, to compute an appropriate precoding weights for each downlink data streams, encode one or more data streams into encoded data streams. Precoding is a generalization of beamforming or shaping the spatial transmission of downlink data that enables a wireless access network to support multi-stream (or multi-layer) transmission in multi-antenna wireless communications. Precoding of multi-layer transmission is decided such that the downlink receive signal to noise ratio (SNR) is maximized for each layer and the inter-layer interference is minimized or in other words signal-to-interference plus noise radio (SINR) is maximized for each layer. In point-to-point systems, precoding means that multiple data streams are emitted from the transmit antennas with appropriate weightings such that the link throughput is maximized at the receiver output. In multi-user MIMO, the data streams are intended for different users and some measure of the total throughput is maximized.

The antenna space transformer 130 is operative to transmit (210) the encoded data streams through the antenna elements. The transmission of the encoded data streams transforming the encoded data streams from the selected beamspace to the antenna space providing coefficients/weights for each element of the antenna for transmitting the signal to the UE 116A.

The channel estimator 112 is operative to determine a channel estimate for the channel between the antenna elements of the antenna array and the UE. Determining the channel estimate includes determinizing the channel estimate matrix characterizing the wireless channel between the antenna array 102 and the UE 116A.

In the following description we will refer to $H_i(t,f)$ the channel estimate matrix characterizing the wireless channel between the antenna array 102 and the UE 116A at time instant t and frequency f. The matrix $H_i(t,f)$ of dimension $M_V \times M_H \times 2$ is defined such that the (m,n,p) element of $H_i(t,f)$ is the coefficient of the channel between the UE 116A and antenna element a(m,n,p) in row m, column n and polarization p at time instant t and frequency f, where m=1, ..., $M_V$, n=1, ..., $M_H$, and p=0, 1.

Furthermore, the $2M_V M_H \times 1$ full channel vector associated with the UE 116A can be defined as $$h_i(f,t)=[h_i^{(0)^T}(f,t),h_i^{(1)^T}(f,t)]]^T \quad (1)$$

In the enclosed description $(.)^T$ denotes the vector transpose operator and $(.)^H$ denotes the Hermitian transpose operator, and $h_i^{(p)}(f,t)$ is the $M_V M_H \times 1$ vector containing the coefficients of the channel associated with the antennas with polarization p, and $h_i^{(p)}(f,t)$ can be obtained by applying the vectorization operator (that stacks the columns of a 2-dimensional matrix on top of each other) to the two-dimensional sub-matrix of $H_i(f,t)$ associated with polarization p.

In some embodiments, the channel estimate can be determined at the radio access node 101, by the channel estimator 112. In other embodiments, the channel estimate can be determined in another network device (e.g., at the UE 116A or any other network device coupled with the radio access node 101).

Beamspace Transformation:

The beamspace transformer 114 is operative to transform a channel estimate (e.g., $H_i(f,t)$), using multiple distinct sets of spatial orthonormal basis functions to obtain multiple transformed channel estimates. In the following description a spatial orthonormal basis function can be referred to as a basis function or spatial orthonormal basis function interchangeably. Each one of the basis functions represents a transformation in a beamspace from the set of N beamspace transformations 116 and defines a respective one from a multiple beamspaces. Thus, each one of the transformed channel estimates is a representation of the channel estimate in a different beamspace, where the beamspace is defined with a set of spatial orthonormal basis functions.

In one embodiment, the distinct sets of spatial orthonormal basis functions are sets of shifted two-dimensional spatial discrete Fourier transforms (2D-S-DFTs). A set of spatial orthonormal functions includes a set of shifted 2D-S-DFTs. For example, each set of the basis functions is constructed using a shifted 2D-SDFT Beamspace transformation in the vertical and horizontal directions. While some embodiments will be described with reference to 2D-S-DFTs, other embodiments can use other types of spatial orthonormal basis functions that define transformations in N respective beamspaces without requiring that these transformations be defined based on the shifted 2D-S-DFTs without departing from the scope of the present disclosure.

In the embodiment where shifted 2D-S-DFTs are used and $s_H$ and $s_V$ respectively denote a shift in the horizontal and vertical directions a $2M_V M_H \times 2M_V M_H$ matrix containing the basis of a 2D-SDFT beamspace transformation associated with ($s_H, s_V$) is given by:

$$B(s_H,s_V)=I_2 \otimes D_H(s_H) \otimes D_V(s_V) \quad (1)$$

where $D_H(s_H)$ and $D_V(s_V)$ are $M_H \times M_H$ and $M_V \times M_V$ shifted DFT matrices, and the (m,k) element of $D_X(s_X)$ is given by $$\frac{1}{\sqrt{M_X}}e^{j\frac{2\pi m\left(k+\frac{s_X}{O_X}\right)}{M_X}}$$

Where m, k=0, ..., $M_X$-1, $s_X$=0, ..., $O_X$-1, and $O_X$ is the oversampling rate in the direction X.

Figure 5:
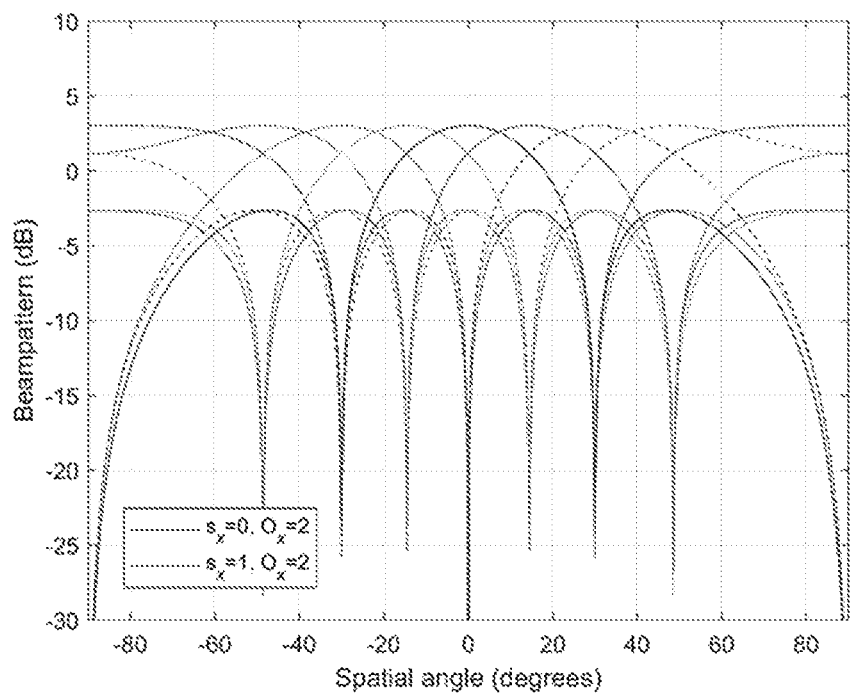
FIG. 5 illustrates a block diagram of an exemplary beam pattern emitted through an antenna array for exemplary shifted DFT basis, in accordance with some embodiments.

FIG. 5 illustrates a block diagram of an exemplary beam pattern emitted through an antenna array for exemplary shifted DFT basis, in accordance with some embodiments. FIG. 5 shows the beam pattern for a set of beamspace transformations including two components constructed using a shifted S-DFT basis for the case of $M_X$=4 and $O_X$=2 where a first plots correspond to $s_X$=0 while a second plot corresponds to $s_X$=1. In the illustrated diagram the proposed set of beamspace transformations has the effect of providing an oversampled basis for the subspace that can provide improved focusing of the captured channel power.

The beamspace transformer 114 transforms the channel estimate $H_i$ into N transformed channel estimates according to the sets of basis functions. Each transformed channel is a representation of the channel estimate $H_i$ in a corresponding beamspace.

When the basis functions are represented by the matrix B(j), the transformed channel estimate of the $i^{th}$ UE (116A) at time instant t and frequency f is determines as:

$$\tilde{h}_i(j,f,t)=B(j)^H h_i(f,t) \quad (2)$$

The beamspace selector 118 is operative to determine respective measures of quality of beamspace transformation for each one of the transformed channel estimates.

In some embodiments, the measure of quality of beamspace transformation is a measure of power-per-beam for the ith UE 116A determined for each one of the N transformed channel estimates. Multiple mechanisms can be used to determine the measure of power per beam of a transformed channel estimate. Some embodiments will be described below, however, one of ordinary skill in the art may understand that other mechanisms can be used to determine a measure of power-per-beam for each one of the transformed channel estimates from the N transformed channel estimates. The below embodiments will describe different measure of power per beam for each one of the transformed channel estimates. One of ordinary skill in the art will understand the following operations are performed for the N transformed channel estimate.

In a first embodiment, the measure of power-per-beam can be computed by averaging the power measured for a transformed channel estimate over multiple frequencies. When the $2M_V M_H \times 1$ vector $\tilde{p}_i(j,t)$ denotes the instantaneous power-per-beam vector for the ith UE and a given transformed channel estimate $\tilde{h}_i(j)$, the $b^{th}$ component of the vector $\tilde{p}_i(j,t)$ can be computed by averaging over frequency as follows:

$$\tilde{p}_i(j,t)[b] = \frac{\Sigma_f |\tilde{h}_i(j,f,t)[b]|^2}{N_f} \quad (3)$$

where $\tilde{p}_i(s_H,s_V,t)[b]$ denotes the $b^{th}$ component of the vector $\tilde{p}_i(s_H,s_V,t)$ and $N_f$ is the number of available frequencies.

In a second embodiment, the measure of power-per-beam can be computed by averaging the power measured for a transformed channel estimate over polarization. In this embodiment, when $\tilde{q}_i(j,t)$ denotes the power-per-beam vector averaged over the two polarizations where the dimension of $\tilde{q}_i(j,t)$ is equal to $M_V M_H \times 1$, the vector $\tilde{q}_i(j,t)$ can be obtained by adding the power-per-beam of the two polarizations, i.e., $$\tilde{q}_i(j,t) = ([1,1] \otimes I_{M_V M_H}) \tilde{p}_i(j,t) \quad (4)$$

where $\otimes$ denotes the Kronecker product operator.

In a third embodiment, a temporal filtering can be applied on the computed power-per-beam of each transformed channel estimate to smooth out temporal variations that might occur when the number of available frequencies is small. For each beamspace basis matrix $B(s_H,s_V)$, given the instantaneous power-per-beam at time t, $\tilde{p}_i(j,t)$, the filtered power-per-beam, $\tilde{p}_{i,F}(j,t)$, is updated as $$\tilde{p}_{i,F}(j,t) = \beta \tilde{p}_{i,F}(j,t) + (1-\beta) \tilde{p}_i(j,t) \quad (5)$$

where $$\beta = e^{-\frac{t-t_0}{W_t}},$$

$t_0$ is the time of last update of the filtered power-per-beam and $W_t$ is the effective memory length with can be selected to match the rate of change of the channel estimate covariance based on the mobility of the UE.

In one embodiment, the complexity of the beamspace transformation and beam reduction mechanism can be significantly reduced by calculating a measure of power-per-beam for a subset of the available beams for each transformed channel estimate. In some embodiments, this can be performed in scenarios when the UE 116A has a low mobility. The active beams provide information on the directions of dominant propagation paths of the channel between the UE and the antenna and vary slowly with mobility. For example, the power-per-beam can be calculated for the active beams and their immediate neighbors, i.e., the transformed channel estimate of the $i^{th}$ UE at time instant t and frequency f that is used to determine the measure of power per beam is expressed as $$\tilde{h}_i(j,f,t) = S_{p,i} B(j)^H h(f,t) \quad (6)$$

where $S_{p,i}$ is a diagonal beam selection matrix that selects only the active beams in the last time instant and their immediate neighbors for power-per-beam calculation. In these embodiments, the measure of power-per-beam can be performed based on any one of the equation (3), (4), or (5) and using the $\tilde{h}_j(s_H,s_V,f,t)$ as defined in equation (6).

In some embodiments, the measure of quality of beamspace transformation for each transformed channel estimate can be an estimated signal to interference-plus-noise ratio of the beamspace-transformed precoders. In this embodiment, signal to interference and noise ratio (SINR) is computed for each beam of a transformed channel estimate.

$$\gamma(j,f,t) = \frac{\tilde{p}_i(j,f,t)}{\eta(j,f,t)} \quad (7)$$

where $\eta(j,f,t)$ represents the average interference and noise power estimated or measured on the beam (j) at time t and frequency f. $\eta$ can be estimated from the channel estimation error statistics. In some embodiments, $\eta$ can also be estimated based on the UE reported interference and noise measurements on each beam. UE reported measurement can be based on the received CSI-RS NZP or ZP signals.

Beamspace Selection

Following the beamspace transformations of the channel estimate based on multiple sets of basis functions and the determination of a measure of quality for each one of the transformed estimate channels, the space selector 118 is operative to select, based on the measures of quality of beamspace transformation, a set of spatial orthonormal basis functions to satisfy a beamspace reduction criteria for the radio channel. The selection of the set of basis functions can be referred to as beamspace selection. The selected set of spatial orthonormal basis functions can be selected as one of the spatial orthonormal basis functions that transforms the channel estimate into a single beamspace. Alternatively, the selected set of spatial orthonormal basis functions can be selected from multiple ones of the sets of spatial orthonormal basis functions, such as for example, a first one of the selected basis functions provides from a first one of the sets of spatial orthonormal basis functions, and a second one of the selected basis functions provides from a second one of the sets of the spatial orthonormal basis functions that is distinct from the first one.

In the embodiments described herein, each one of the transformed channel estimates includes a respective set of beams. Multiple mechanisms can be used to select a set of spatial orthonormal basis functions.

In some embodiments, the beamspace selector 118 selects, for each one of the N beamspaces, a respective subset of beams to be activated from the set of beams of the corresponding transformed channel estimate. The subset of beams is selected based on the beamspace reduction criteria. The beamspace selector 118 is further operative to select, based on the multiple subsets of beams to be activated for the beamspaces, the beamspace that yields a respective subset of beams to be activated that has a number of beams that is smaller than a number of beams of other ones of the respective subsets of beams. The selection of the beamspace includes selecting a set of spatial orthonormal basis functions.

The selection of the subset of beams to be activated for each one of the N transformed channel estimate and the selection of the beamspace can be performed according to multiple embodiments.

In a first embodiment, the beamspace selector 118 is operative to select, for each one of the beamspaces, based on a measure of power per beam, the respective subset of beams that yields a maximum measure of power of the transformed channel estimate in the beamspace at a given time, when the number of beams in the respective subset is a predetermined number of beams.

Thus, in this embodiment, a fixed number $R_F$ of beams to be activated is predetermined in the beamspace selector 118 and for each basis functions matrix B(j) the, $R_F$ beams that yield the maximum measure of power for the transformed channel estimate:

$$\tilde{P}_i(j,t) = \Sigma_{b \in A_i(j,t)} \tilde{p}_i(j,t)[b] \qquad (8)$$

where $A_i(s_H, s_V, t)$ denotes the set of selected beams to be activated for the basis functions matrix $B(s_H, s_V)$ at time t and the number of element of the set $A_i(s_H, s_V, t)$ is equal to $R_F$, i.e., $|A_i(s_H, s_V, t)| = R_F$. Afterwards, the basis functions (the beamspace) that yields the maximum value of $\tilde{P}_i(s_H, s_V, t)$ are selected.

In a second embodiment, the beamspace selector 118 is operative to select, for each one of the beamspaces, a subset of beams to be activated based on a measure of power per beam for each one of the beamspaces, the respective subset of beams that has a cumulative measure of power greater than a predetermined fraction of a total measure of power of all beams of the transformed channel estimate in the beamspace at a given time.

Thus, in this embodiment, the selection of the beams to be activated is based on a collected power in active beams. The minimum number of beams that have a total power greater than a fraction $\alpha$ of the total power in all beams is selected. In some embodiments, the set of beams to be activated for each one of the transformed channel estimates, is the solution to the following optimization problem:

$$\min |A_i(j,t)| \text{ s.t. } \Sigma_{b \in A_i(j,t)} \tilde{p}_i(j,t)[b] > \alpha \Sigma_b \tilde{p}_i(j,t)[b] \qquad (9).$$

In this embodiment, for each one of the transformed channel estimates the number of active beams $|A_i(s_H, s_V, t)|$ and the captured power in the active beams $$\tilde{P}_i(j,t) = \Sigma_{b \in A_i(j,t)} \tilde{p}_i(j,t)[b] \qquad (10)$$

are determined.

Then the basis functions (beamspace) that yields the minimum number of active beams is selected.

In a third embodiment, the beamspace selector 118 is operative to select for each one of the beamspaces, a subset of beams to be activated, based on a measure of power per beam for each one of the beamspaces, the respective subset of beams wherein each beam from the subset of beams has a respective measure of power greater than a predetermined threshold of a total measure of power of all beams of the transformed channel estimate in the beamspace at a given time.

Thus, in this embodiment, the selection of the beams to be activated is based on a threshold measure of power. The beams that have a measure of power greater than a threshold $\gamma$ of the total beam power are selected. In some embodiments, the set of selected active beams is given by the following equation $$A_i(j,t) = \{b | \tilde{p}_i(j,t)[b] > \gamma \Sigma_b \tilde{p}_i(j,t)[b_j]\} \qquad (11)$$

The number of active beams $|A_i(S_H, S_V, t)|$ and the captured power in the active beams $$\tilde{p}_i(j,t) = \Sigma_{b \in A_i(j,t)} \tilde{p}_i(j,t)[b] \qquad (12)$$

is determined. The basis functions (beamspace) that yields the minimum number of active beams is selected.

In some embodiments, at least two beamspaces may have the same number of beams that is smaller than any other ones of the beamspaces. In these embodiments, the beamspace selector 118 may determine whether any beamspaces have the same number of beams (e.g., two or more beamspaces may result in a same minimum number of beams that is activated). Responsive to determining that there are at least two beamspaces that have the same number of beams that is smaller than a number of beams of other ones of the respective subsets of beams, the beamspace selector 118 determines the beamspace from the at least two beamspaces that has a greater cumulative measure of power for the respective subset of beams to be activated than the cumulative measure of power for the respective subset of beams of the other ones of the at least two beamspaces.

Beamspace Reduction:

In some embodiments, once a set of basis functions is selected a beamspace the beamspace selector 118 transforms the channel estimate based on the selected set of basis functions to obtain the transformed channel estimate. In some embodiments, a reduction operation is further performed at the beamspace reduction unit 119 to obtain the reduced channel estimate.

Dimension reduction is applied to produce a sparse channel vectors $$\tilde{h}_i(f,t) = S_i \hat{h}_i(j,f,t) \qquad (12)$$

where the $b^{th}$ diagonal entry of the matrix $S_i$ is equal to 1 if the corresponding beam is included in the set of active beams $A_i(j,t)$.

In the embodiment where the basis functions are shifted SFDT and $\hat{s}_{H,i}(t)$, $\hat{s}_{V,i}(t)$ respectively denote the horizontal and vertical shifts of the selected basis functions, the equation (12) becomes the following:

$$\tilde{h}_i(f,t) = S_i \hat{h}_i(\hat{s}_{H,i}(t), \hat{s}_{V,i}(t), f, t) \qquad (13)$$

In the embodiment where averaging is performed over polarization when the power-per-beam is computed, then $$S_i[b,b] = S_i(b + M_V M_H, b + M_V M_H) \qquad (14)$$

i.e., the beams on the two polarizations are activated simultaneously or deactivated simultaneously.

MU-MIMO Beamspace Reduction

In some embodiments, L user equipments can be paired with the antenna array 102. For example, UE0, UE1, . . . , UEL−1 are Multiple User (MU)-MIMO paired, i.e., the same time-frequency resources are shared among the L UEs. In this example, performing the beamspace reduction on the combined MU-MIMO channel of all the UEs reduces the excess inter-UE interference caused by beam reduction. The $2M_V M_H \times L$ MU-MIMO downlink beamspace channel for subband f at time t without beam reduction is given by $$\tilde{H}(j,f,t) = [B(j)^H h_0(f,t) \ldots B(j)^H h_{L-1}(f,t)] \qquad (15).$$

Accordingly, the instantaneous power per beam is computed for the combined MU-MIMO by considering the channels of all the UEs. Hence, the power per beam $\tilde{p}(j,t)$ can be computed by averaging over frequency and UE channels as follows $$\tilde{p}_i(j,t)[b] = \frac{\sum_{i=0}^{L-1} \Sigma_f |\tilde{h}_i(j,f,t)[b]|^2}{N_f} \qquad (16)$$

Beam reduction and Beamspace selection can then be applied using the collected power per beam for the combined MU-MIMO channel estimate using the techniques described above with respect to the beamspace selection and beamspace reductions sections.

The mechanisms described herein present several advantages when compared with standard beamspace transformation techniques. The described mechanisms enable an increase of the power contained in the reduced channel estimates leading to a more accurate channel representation and improved performance of precoding operations performed in beamspace. Further, the mechanisms described herein increase the sparsity of the reduced channel estimate which significantly reduces the complexity of precoding calculation as well as the cost of transferring the weights computed during the precoding operation between different units of the radio access network device. In addition, the mechanisms reduce the noise that is added by the received signal as some weights are nullified through the beamspace reduction.

In some embodiments, averaging of a quality measure of the beamspace transformation over frequency, time, and polarization is also proposed to improve the stability of the quality measure. Further in some embodiments of MU-MIMO precoding, the averaging can be performed over all the paired UEs before a common set of active beams is selected for all the UEs.

The operations in the flow diagrams will be described with reference to the exemplary embodiments of FIG. 1. However, it should be understood that the operations of the flow diagrams can be performed by embodiments of the invention other than those discussed with reference to FIG. 1, and the embodiments of the invention discussed with reference to FIG. 1 can perform operations different than those discussed with reference to the flow diagrams.

Figure 2:
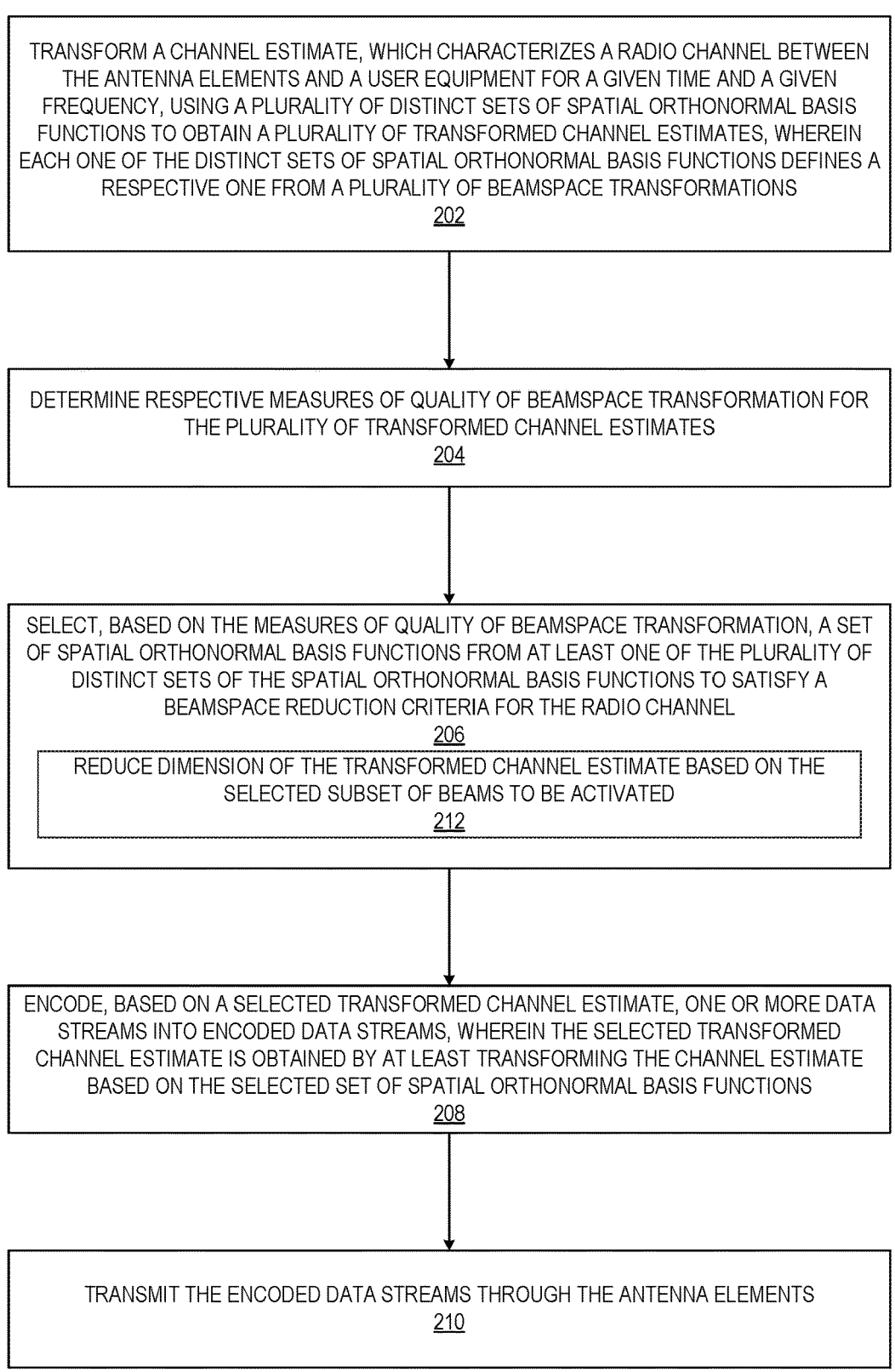
FIG. 2 illustrates a flow diagram of exemplary operations that can be performed for beamspace processing in accordance with some embodiments.

FIG. 2 illustrates a flow diagram of exemplary operations that can be performed for beamspace processing in accordance with some embodiments. A channel estimate characterizes a radio channel between the antenna elements 102 and a user equipment (e.g., UE 116A) for a given time and a given frequency. As discussed above the channel estimate can be represented/modeled with a channel estimate matrix $H_r(t,f)$, where t is a time parameter and f is a frequency parameter. In some embodiments, the channel estimate can be determined at the radio access node 101, by the channel estimator 112. In other embodiments, the channel estimate can be determined in another network device (e.g., at the UE 116A or any other network device coupled with the radio access node 101).

At operation 202, the beamspace transformer 114 transforms a channel estimate using multiple distinct sets of spatial orthonormal basis functions to obtain a set of transformed channel estimates. Each one of the spatial orthonormal basis functions is a beamspace transformation (from the set of N beamspace transformations 116) and defines a respective one from a multiple beamspaces. Thus, each one of the transformed channel estimates is a representation of the channel estimate in a different beamspace, where the beamspace is defined with a set of spatial orthonormal basis functions.

In some embodiments, the distinct sets of spatial orthonormal basis functions are sets of shifted two-dimensional spatial discrete Fourier transforms (2D-S-DFTs). A set of spatial orthonormal functions includes a set of shifted 2D-S-DFTs. For example, each set of the basis functions is constructed using a shifted 2D-SDFT Beamspace transformation in the vertical and horizontal directions. While some embodiments are described with reference to 2D-S-DFTs, other embodiments can use other types of spatial orthonormal basis functions that define transformations in N respective beamspaces without requiring that these transformations be defined based on the shifted 2D-S-DFTs without departing from the scope of the present disclosure.

At operation 204, the beamspace selector 118 determine for each one of the transformed channel estimates a respective measure of quality of the beamspace transformation. The measure of quality can be a measure of power per beam or a SINR as describe with respect to several embodiments above.

At operation 206, the beamspace selector 118 selects, based on the measures of quality of beamspace transformation, a set of spatial orthonormal basis functions from at least one of the distinct sets of the spatial orthonormal basis functions to satisfy a beamspace reduction criteria for the radio channel. The selected set of spatial orthonormal basis functions can be selected as one of the spatial orthonormal basis functions that transforms the channel estimate into a single beamspace. Alternatively, the selected set of spatial orthonormal basis functions can provide from multiple ones of the sets of spatial orthonormal basis functions, such as for example, a first one of the selected basis functions provides from a first one of the sets of spatial orthonormal basis functions, and a second one of the selected basis functions provides from a second one of the sets of the spatial orthonormal basis functions that is distinct from the first one.

At operation 208, the precoder 120 encodes based on a selected transformed channel estimate, the data streams into encoded data streams. The selected transformed channel estimate is obtained by transforming the channel estimate according to the selected set of spatial orthonormal basis functions. In some embodiments, the selected transformed channel estimate is further obtained by reducing, at operation 212, dimension of the transformed channel estimate based on a selected subset of beams to be activated.

At operation 210, the encoded data stream is transmitted through the antenna elements.

The selection, at operation 206, of the set of spatial orthonormal basis functions is performed based on the measures of quality of beamspace transformation determined for each one of the set of basis functions. In the embodiments described herein, each one of the transformed channel estimates includes a respective set of beams. FIG. 3 illustrates a flow diagram of exemplary operations that can be performed for selection of a beamspace from multiple beamspaces, in accordance with some embodiments.

In some embodiments, the selection of the beamspace includes operations 302 and 304. At operation 302, for each one of the N beamspaces, a respective subset of beams to be activated is selected, by the beamspace selector 118, from the set of beams of the corresponding transformed channel estimate. The subset of beams is selected based on the beamspace reduction criteria.

FIG. 4 illustrates a flow diagram of exemplary operations that can be performed for selection for each beamspace of a subset of beams to be activated, in accordance with some embodiments.

In a first embodiment, selecting, for each one of the beamspaces, a subset of beams to be activated includes selecting (operation 402), based on a measure of power per beam, the respective subset of beams that yields a maximum measure of power of the transformed channel estimate in the beamspace at a given time, when the number of beams in the respective subset is a predetermined number of beams.

In a second embodiment, selecting, for each one of the beamspaces, a subset of beams to be activated includes selecting (operation 404), based on a measure of power per beam for each one of the beamspaces, the respective subset of beams that has a cumulative measure of power greater than a predetermined fraction of a total measure of power of all beams of the transformed channel estimate in the beamspace at a given time.

In a third embodiment, selecting, for each one of the beamspaces, a subset of beams to be activated includes selecting (operation 406), based on a measure of power per beam for each one of the beamspaces, the respective subset of beams wherein each beam from the subset of beams has a respective measure of power greater than a predetermined threshold of a total measure of power of all beams of the transformed channel estimate in the beamspace at a given time.

Referring back to FIG. 3, the flow of operations moves from operation 302 to operation 304. At operation 304, based on the multiple subsets of beams to be activated for the beamspaces, the beamspace selector 118 selects the beamspace that yields a respective subset of beams to be activated that has a number of beams that is smaller than a number of beams of other ones of the respective subsets of beams.

In some embodiments, at least two beamspaces may have the same number of beams that is smaller than any other ones of the beamspaces. In these embodiments, the beamspace selector 118 may determine whether any beamspaces have the same number of beams (e.g., two or more beamspaces may result in a same minimum number of beams that is activated). Responsive to determining (at operation 306) that there are at least two beamspaces that have the same number of beams that is smaller than a number of beams of other ones of the respective subsets of beams, the beamspace selector 118 determines the beamspace from the at least two beamspaces that has a greater cumulative measure of power for the respective subset of beams to be activated than the cumulative measure of power for the respective subset of beams of the other ones of the at least two beamspaces.

Figure 6:
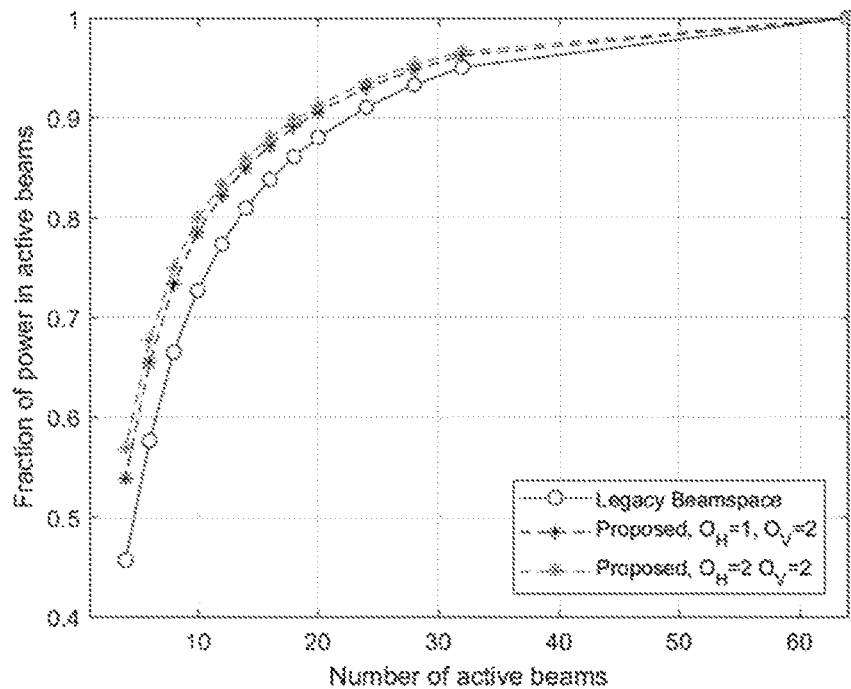
FIG. 6 illustrates a diagram of an exemplary graph representing a measure of power in active beams versus the number of active beams, in accordance with some embodiments.

FIG. 6 illustrates a diagram of an exemplary graph representing a measure of power in active beams versus the number of active beams, in accordance with some embodiments. FIG. 6 shows the fraction of power in the reduced channel estimate after beam reduction versus the number of active beams present. One of ordinary skill in the art can determine that the proposed beamspace processing mechanisms significantly improve the captured power in a channel estimates after the channel estimate is transformed based on a beam selection and reduction mechanisms when compared with a standard beamspace processing in which the channel is transformed based on a single determined beamspace (legacy beamspace).

Figure 7:
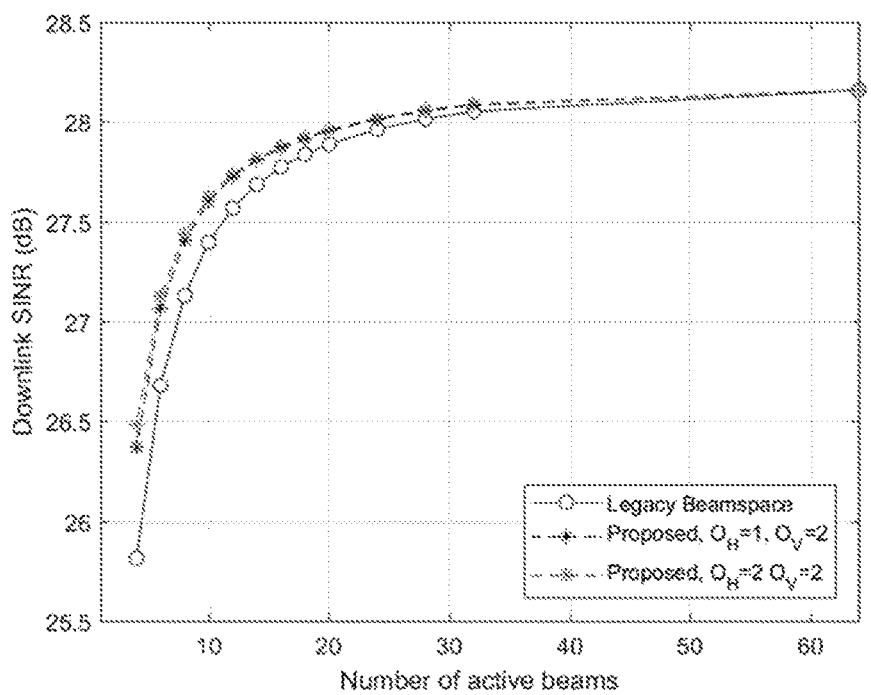
FIG. 7 illustrates a diagram of an exemplary graph representing a signal-to-interference-plus-noise ratio (SINR) versus the number of active beams, in accordance with some embodiments.

FIG. 7 illustrates a diagram of an exemplary graph representing a signal-to-interference-plus-noise ratio (SINR) versus the number of active beams, in accordance with some embodiments. FIG. 7 shows the average the signal-to-interference-plus-noise ratio (SINR) of the signal received at the UEs based on different channel estimates. There is a clear improved improvements in the received SINR with channel estimates determined after beam selection/reduction when compared with a received SINR with a standard channel estimate that is transformed based on a single determined beamspace (legacy beamspace). For example, when the number of active beams is equal to 8, the SINR improvement due to the proposed beamspace processing is equal to 0.5 dB.

The mechanisms described herein present several advantages when compared with standard beamspace transformation techniques. The described mechanisms enable an increase of the power contained in the reduced channel estimates leading to a more accurate channel representation and improved performance of precoding operations performed in beamspace. Further, the mechanisms described herein increase the sparsity of the reduced channel estimate which significantly reduces the complexity of precoding calculation as well as the cost of transferring the weights computed during the precoding operation between different units of the radio access network device. In addition, the mechanisms reduce the noise that is added by the received signal as some weights are nullified through the beamspace reduction.

In some embodiments, averaging of a quality measure of the beamspace transformation over frequency, time, and polarization is also proposed to improve the stability of the quality measure. Further in some embodiments of MU-MIMO precoding, the averaging can be performed over all the paired UEs before a common set of active beams is selected for all the UEs.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As used herein, use equipment (UE) refers to a device capable, configured, arranged and/or operable to communicate wirelessly with network nodes and/or other wireless devices. Unless otherwise noted, the term UE may be used interchangeably herein with wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as a machine-type communication (MTC) device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

Figure 8:
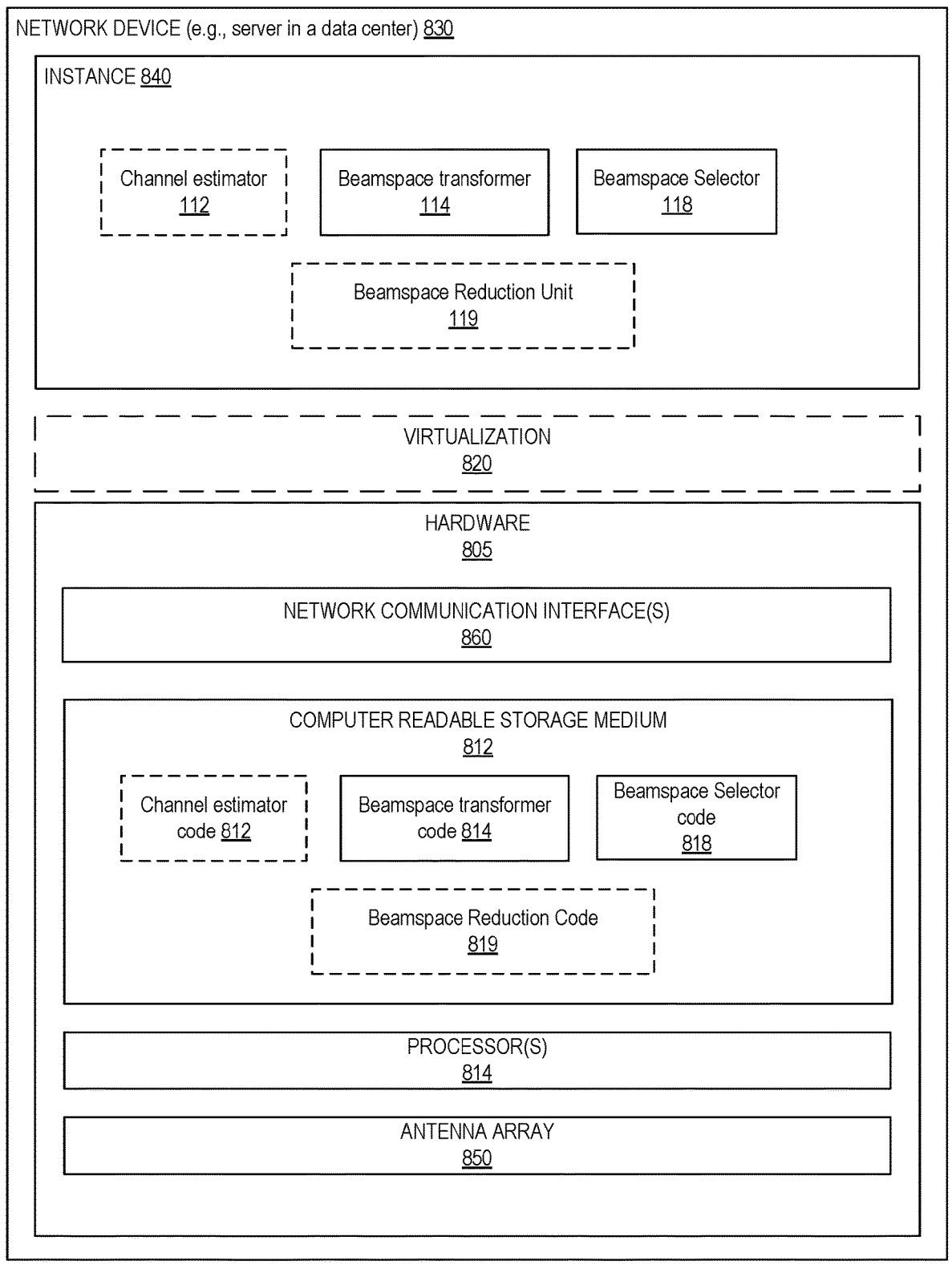
FIG. 8 illustrates a block diagram of an exemplary network device (ND), according to some embodiments of the invention.

FIG. 8 illustrates a block diagram of a network device 830 that can be used in some embodiments. In some embodiments, the network device 830 includes hardware 805. Hardware 805 includes network communication interfaces 860 coupled with a computer readable storage medium 812 and an antenna array 850. The computer readable storage medium 812 may include channel estimator code 812, beamspace transformer code 814, beamspace selector code 818, and beamspace reduction code 819. The channel estimator code 812, beamspace transformer code 814, beamspace selector code 818, and beamspace reduction code 819 when executed on one or more processors 814 causes the network device to perform operations described with reference to one or more of FIGS. 1-7.

Processor(s) 814 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network device components, such as device readable medium, network node functionality. For example, processor(s) may execute instructions stored in device readable medium. Such functionality may include providing any of the various wireless features, functions, or benefits discussed herein. In some embodiments, processor(s) 814 may include a system on a chip (SOC).

In certain embodiments, some or all of the functionality described herein as being provided by a network node, base station, eNB or other such network device may be performed by processor(s) 814 executing instructions stored on device readable medium 812. In alternative embodiments, some or all of the functionality may be provided by processor(s) 814 without executing instructions stored on a separate or discrete device readable medium, such as in a hard-wired manner. In any of those embodiments, whether executing instructions stored on a device readable storage medium or not, processors 814 can be configured to perform the described functionality.

While one embodiment does not implement virtualization, alternative embodiments may use different forms of virtualization. For example, in one such alternative embodiment the virtualization layer 820 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 820 represents a hypervisor (sometimes referred to as a virtual machine monitor (VMM)) or a hypervisor executing on top of a host operating system, and each of the sets of applications is run on top of a guest operating system within an instance 840 called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 805, directly on a hypervisor (in which case the unikernel is sometimes described as running within a LibOS virtual machine), or in a software container, embodiments can be implemented fully with unikernels running directly on a hypervisor represented by virtualization layer 820, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented, are collectively referred to as software instance(s). Each set of applications, corresponding virtualization construct if implemented, and that part of the hardware that executes them (be it hardware dedicated to that execution and/or time slices of hardware temporally shared), forms a separate virtual network element(s). More generally, however, network nodes may represent any suitable device (or group of devices) capable, configured, arranged, and/or operable to enable and/or provide a wireless device with access to the wireless network or to provide some service to a wireless device that has accessed the wireless network.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for beamspace processing in a radio access node of a wireless communication network, wherein the radio access node is coupled with an antenna array including a plurality of antenna elements, the method comprising:
    transforming a channel estimate, which characterizes a radio channel between the antenna elements and a user equipment for a given time and a given frequency, using a plurality of distinct sets of spatial orthonormal basis functions to obtain a plurality of transformed channel estimates, wherein each one of the distinct sets of spatial orthonormal basis functions defines a respective one from a plurality of beamspaces and wherein each one of the transformed channel estimates includes a respective set of beams;
    determining respective measures of quality of beamspace transformation for the plurality of transformed channel estimates;
    selecting, based on the measures of quality of beamspace transformation, a set of spatial orthonormal basis functions from at least one of the plurality of distinct sets of the spatial orthonormal basis functions to satisfy a beamspace reduction criteria for the radio channel by:
        selecting for each one of the plurality of beamspaces a respective subset of beams from the respective set of beams to be activated based on the beamspace reduction criteria; and
        determining, based on the subsets of beams to be activated for the beamspaces, the beamspace that yields a respective subset of beams to be activated that has a number of beams that is smaller than a number of beams of other ones of the respective subsets of beams;
    wherein the set of spatial orthonormal basis functions defines a selected beamspace from the plurality of beamspaces;
    encoding, based on a selected transformed channel estimate, one or more data streams into encoded data streams, wherein the selected transformed channel estimate is obtained by at least transforming the channel estimate based on the selected set of spatial orthonormal basis functions; and
    transmitting the encoded data streams through the antenna elements.

2. The method of claim 1, wherein determining, based on the subsets of beams to be activated for the beamspaces, the beamspace that yields a respective subset of beams to be activated that has a number of beams that is smaller than a number of beams of other ones of the respective subsets of beams includes:
    responsive to determining that there are at least two beamspaces that have a same number of beams that is smaller than a number of beams of other ones of the respective subsets of beams, determining the beamspace from the at least two beamspaces that has a greater cumulative measure of power for the respective subset of beams to be activated than the cumulative measure of power for the respective subset of beams of the other ones of the at least two beamspaces.

3. The method of claim 1, wherein selecting, for each one of the plurality of beamspaces, a respective subset of beams from the respective set of beams to be activated based on the beamspace reduction criteria includes:
    selecting, based on a measure of power per beam for each one of the beamspaces, the respective subset of beams that yields a maximum measure of power of the transformed channel estimate in the beamspace at a given time, wherein the number of beams in the respective subset is a predetermined number of beams.

4. The method of claim 1, wherein selecting, for each one of the plurality of beamspaces, a respective subset of beams from the respective set of beams to be activated based on the beamspace reduction criteria includes:
    selecting, based on a measure of power per beam for each one of the beamspaces, the respective subset of beams that has a cumulative measure of power greater than a predetermined fraction of a total measure of power of all beams of the transformed channel estimate in the beamspace at a given time.

5. The method of claim 1, wherein selecting, for each one of the plurality of beamspaces, a respective subset of beams from the respective set of beams to be activated based on the beamspace reduction criteria includes:
    selecting, based on a measure of power per beam for each one of the beamspaces, the respective subset of beams wherein each beam from the subset of beams has a respective measure of power greater than a predetermined threshold of a total measure of power of all beams of the transformed channel estimate in the beamspace at a given time.

6. The method of claim 1, wherein the selected transformed channel estimate is further obtained by reducing dimension of the transformed channel estimate based on the selected subset of beams to be activated.

7. The method of claim 1, wherein the distinct sets of spatial orthonormal basis functions are sets of shifted two-dimensional spatial discrete Fourier transforms (2D-S-DFTs).

8. A radio access node for beamspace processing, the radio access node comprising:
an antenna array including a plurality of antenna elements;
one or more processors; and
a computer readable storage medium storing a set of computer readable instructions that when executed by the one or more processors cause the radio access node to:
transform a channel estimate, which characterizes a radio channel between the antenna elements and a user equipment for a given time and a given frequency, using a plurality of distinct sets of spatial orthonormal basis functions to obtain a plurality of transformed channel estimates, wherein each one of the distinct sets of spatial orthonormal basis functions defines a respective one from a plurality of beamspace transformations and wherein each one of the transformed channel estimates includes a respective set of beams;
determine respective measures of quality of beamspace transformation for the plurality of transformed channel estimates;
select, based on the measures of quality of beamspace transformation, a set of spatial orthonormal basis functions from at least one of the plurality of distinct sets of the spatial orthonormal basis functions to satisfy a beamspace reduction criteria for the radio channel by operations to:
select for each one of the plurality of beamspaces a respective subset of beams from the respective set of beams to be activated based on the beamspace reduction criteria; and
determine, based on the subsets of beams to be activated for the beamspaces, the beamspace that yields a respective subset of beams to be activated that has a number of beams that is smaller than a number of beams of other ones of the respective subsets of beams;
wherein the set of spatial orthonormal basis functions defines a selected beamspace from the plurality of beamspaces;
encode, based on a selected transformed channel estimate, one or more data streams into encoded data streams, wherein the selected transformed channel estimate is obtained by at least transforming the channel estimate based on the selected set of spatial orthonormal basis functions; and
transmit the encoded data streams through the antenna elements.

9. The radio access node of claim 8, wherein to determine, based on the subsets of beams to be activated for the beamspaces, the beamspace that yields a respective subset of beams to be activated that has a number of beams that is smaller than a number of beams of other ones of the respective subsets of beams includes to:
responsive to determining that there are at least two beamspaces that have a same number of beams that is smaller than a number of beams of other ones of the respective subsets of beams, determine the beamspace from the at least two beamspaces that has a greater cumulative measure of power for the respective subset of beams to be activated than the cumulative measure of power for the respective subset of beams of the other ones of the at least two beamspaces.

10. The radio access node of claim 8, wherein to select, for each one of the plurality of beamspaces, a respective subset of beams from the respective set of beams to be activated based on the beamspace reduction criteria includes to:
select, based on a measure of power per beam for each one of the beamspaces, the respective subset of beams that yields a maximum measure of power of the transformed channel estimate in the beamspace at a given time, wherein the number of beams in the respective subset is a predetermined number of beams.

11. The radio access node of claim 8, wherein to select, for each one of the plurality of beamspaces, a respective subset of beams from the respective set of beams to be activated based on the beamspace reduction criteria includes to:
select, based on a measure of power per beam for each one of the beamspaces, the respective subset of beams that has a cumulative measure of power greater than a predetermined fraction of a total measure of power of all beams of the transformed channel estimate in the beamspace at a given time.

12. The radio access node of claim 8, wherein to select, for each one of the plurality of beamspaces, a respective subset of beams from the respective set of beams to be activated based on the beamspace reduction criteria includes to:
select, based on a measure of power per beam for each one of the beamspaces, the respective subset of beams wherein each beam from the subset of beams has a respective measure of power greater than a predetermined threshold of a total measure of power of all beams of the transformed channel estimate in the beamspace at a given time.

13. The radio access node of claim 8, wherein the selected transformed channel estimate is further obtained by reducing dimension of the transformed channel estimate based on the selected subset of beams to be activated.

14. The radio access node of claim 8, wherein the distinct sets of spatial orthonormal basis functions are sets of shifted two-dimensional spatial discrete Fourier transforms (2D-S-DFTs).

15. A non-transitory computer readable storage medium storing instructions that, when executed by the one or more processors, cause a radio access node that is coupled with an antenna array, including a plurality of antenna elements, to perform operations for beamspace processing comprising:
transforming a channel estimate, which characterizes a radio channel between the antenna elements and a user equipment for a given time and a given frequency, using a plurality of distinct sets of spatial orthonormal basis functions to obtain a plurality of transformed channel estimates, wherein each one of the distinct sets of spatial orthonormal basis functions defines a respective one from a plurality of beamspaces and wherein each one of the transformed channel estimates includes a respective set of beams;
determining respective measures of quality of beamspace transformation for the plurality of transformed channel estimates;
selecting, based on the measures of quality of beamspace transformation, a set of spatial orthonormal basis functions from at least one of the plurality of distinct sets of the spatial orthonormal basis functions to satisfy a beamspace reduction criteria for the radio channel by:

selecting for each one of the plurality of beamspaces a respective subset of beams from the respective set of beams to be activated based on the beamspace reduction criteria; and determining, based on the subsets of beams to be activated for the beamspaces, the beamspace that yields a respective subset of beams to be activated that has a number of beams that is smaller than a number of beams of other ones of the respective subsets of beams;

wherein the set of spatial orthonormal basis functions defines a selected beamspace from the plurality of beamspaces;

encoding, based on a selected transformed channel estimate, one or more data streams into encoded data streams, wherein the selected transformed channel estimate is obtained by at least transforming the channel estimate based on the selected set of spatial orthonormal basis functions; and transmitting the encoded data streams through the antenna elements.

16. The non-transitory computer readable storage medium of claim 15, wherein determining, based on the subsets of beams to be activated for the beamspaces, the beamspace that yields a respective subset of beams to be activated that has a number of beams that is smaller than a number of beams of other ones of the respective subsets of beams includes:

responsive to determining that there are at least two beamspaces that have a same number of beams that is smaller than a number of beams of other ones of the respective subsets of beams, determining the beamspace from the at least two beamspaces that has a greater cumulative measure of power for the respective subset of beams to be activated than the cumulative measure of power for the respective subset of beams of the other ones of the at least two beamspaces.

17. The non-transitory computer readable storage medium of claim 15, wherein selecting, for each one of the plurality of beamspaces, a respective subset of beams from the respective set of beams to be activated based on the beamspace reduction criteria includes:

selecting, based on a measure of power per beam for each one of the beamspaces, the respective subset of beams that yields a maximum measure of power of the transformed channel estimate in the beamspace at a given time, wherein the number of beams in the respective subset is a predetermined number of beams.

* * * * *